United States Patent
Deng et al.

(10) Patent No.: US 10,244,208 B1
(45) Date of Patent: Mar. 26, 2019

(54) SYSTEMS AND METHODS FOR VISUALLY REPRESENTING USERS IN COMMUNICATION APPLICATIONS

(71) Applicant: Facebook, Inc., Menlo Park, CA (US)

(72) Inventors: Eric Deng, Fremont, CA (US); Andrew Gold, Los Altos, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/839,782

(22) Filed: Dec. 12, 2017

(51) Int. Cl.
*H04N 7/15* (2006.01)
*G06K 9/00* (2006.01)
*G06T 11/60* (2006.01)

(52) U.S. Cl.
CPC ......... *H04N 7/157* (2013.01); *G06K 9/00275* (2013.01); *G06T 11/60* (2013.01)

(58) Field of Classification Search
CPC .......... H04N 7/15; H04N 7/147; H04N 7/157; H04N 21/8146
USPC ............. 349/14.01–14.12; 709/204; 715/764
See application file for complete search history.

(56) References Cited

U.S. PATENT DOCUMENTS

| | | | |
|---|---|---|---|
| 2014/0055554 A1* | 2/2014 | Du | H04N 21/4223 348/14.07 |
| 2016/0134840 A1* | 5/2016 | McCulloch | H04N 7/157 348/14.03 |
| 2017/0153863 A1* | 6/2017 | Shiraishi | A63F 13/58 |

* cited by examiner

*Primary Examiner* — Melur Ramakrishnaiah
(74) *Attorney, Agent, or Firm* — FisherBroyles, LLP (57) ABSTRACT

The disclosed computer-implemented method may include, (1) observing, via at least one sensor, at least one attribute of a user, (2) mapping the observed attribute of the user to a computer-generated avatar that represents the user, (3) determining a level of realism for the avatar, with the level of realism specifying a relationship between an appearance of the avatar and an actual appearance of the user, and (4) dynamically adjusting a computer-generated presentation of the avatar in accordance with the determined level of realism. Various other methods, systems, and computer-readable media are also disclosed.

19 Claims, 9 Drawing Sheets

SYSTEMS AND METHODS FOR VISUALLY REPRESENTING USERS IN COMMUNICATION APPLICATIONS

BACKGROUND

Modern computing devices provide a myriad of communication options for users to connect with one another. For example, users may employ voice-over-internet-protocol (VOIP) applications to communicate via voice, or video conferencing applications to communicate via video. Additionally, advances in virtual reality, augmented reality, and telepresence have also expanded the ways that users may communicate and interact with each other in real, virtual, or mixed environments.

Unfortunately, traditional options for visually representing users within communication applications are limited. For example, conventional avatars, such as may be used to represent users in traditional VOIP applications or artificial environments, may not effectively convey non-verbal cues that humans may rely on to gauge listener engagement in conversations. Additionally, when video communication is available, such as in a conventional video conferencing application, representing the user via a video feed may rob the user of desired privacy. Hence, the instant application identifies and addresses a need for additional ways to visually represent users in communication applications.

SUMMARY

As will be described in greater detail below, the instant disclosure describes various systems and methods for visually representing users in communication applications. The systems and methods described herein may provide dynamic and expressive avatar-based representations of users within communication applications by observing attributes of a user, mapping the observed attributes to a computer-generated avatar that represents the user, determining a level of realism for the avatar, and dynamically adjusting a computer-generated presentation of the avatar in accordance with the determined level of realism.

In one example, a computer-implemented method for visually representing users in communication applications may include (1) observing, via at least one sensor, at least one attribute of a user, (2) mapping the observed attribute of the user to a computer-generated avatar that represents the user, (3) determining a level of realism for the avatar, with the level of realism specifying a relationship between an appearance of the avatar and an actual appearance of the user, and (4) dynamically adjusting a computer-generated presentation of the avatar in accordance with the determined level of realism.

In some embodiments, the method may further include presenting the dynamically adjusted computer-generated presentation of the avatar to an additional user as a representation of the user. In such embodiments, presenting the dynamically adjusted computer-generated presentation of the avatar to the additional user may include presenting the dynamically adjusted computer-generated presentation of the avatar to the additional user via a mobile robot. In some examples, the additional user and the mobile robot are at a common location and the user is at a remote location. In such examples, the mobile robot may represent the user at the common location.

Additionally, in some examples, presenting the dynamically adjusted computer-generated presentation of the avatar to the additional user may include presenting the dynamically adjusted computer-generated presentation of the avatar to the additional user within at least one of (1) a video conferencing application, (2) a virtual reality environment, or (3) an augmented reality environment.

In some examples, the attribute of the user may include at least one of (1) an eye gaze of the user, (2) a posture of the user, (3) a facial feature of the user, and (4) a head pose of the user. In at least one embodiment, mapping the attribute of the user to the avatar may include (1) identifying the observed attribute of the user, (2) associating a feature of the computer-generated avatar with the observed attribute of the user, and (3) adjusting the feature of the computer-generated avatar based on the observed attribute of the user. In such embodiments, identifying the attribute may include determining at least one of (1) an angle of the attribute, (2) an amplitude of the attribute, (3) a directionality of the attribute, (4) a position of the attribute, (5) a proportionality of the attribute relative to another attribute, or (6) a size of the attribute.

In some examples, determining the level of realism for the avatar may include detecting a level of engagement of the user in a conversation. In such examples, determining the level of realism for the avatar may be based on the detected level of engagement of the user in the conversation. In some examples, detecting the level of engagement of the user in the conversation may include detecting at least one of (1) an eye gaze of the user, (2) a head pose of the user, (3) a position of a face of the user relative to the at least one sensor, (4) a distance of the user from the at least one sensor, and (5) a volume of a voice of the user.

In some examples, the method may further include receiving user input representative of a user-defined level of realism for the avatar. In such examples, determining the level of realism may include designating the user-defined level of realism as the level of realism for the avatar.

In at least one example, the level of realism may reflect a degree of correlation between a presentation of the observed attribute of the user by the computer-generated avatar and an actual appearance of the observed attribute of the user. In some embodiments, the level of realism may reflect an amount of detail of the actual appearance of the user that is included in the computer-generated presentation of the avatar. In such embodiments, the amount of detail of the user's appearance may be based on at least one of (1) a resolution of an image of the user, (2) a number of polygons of a model of the user, and (3) a number of nodes of a vector-based representation of the user.

In at least one embodiment, the at least one sensor may be included in a mobile robot. In such embodiments, the at least one sensor may include a camera included in the mobile robot.

In addition, a corresponding system for visually representing users in communication applications may include several modules stored in memory, including (1) an observing module that observes, via at least one sensor, at least one attribute of a user, (2) a mapping module that maps the observed attribute of the user to a computer-generated avatar that represents the user, (3) a determining module that determines a level of realism for the avatar, with the level of realism specifying a relationship between an appearance of the avatar and an actual appearance of the user, (4) an adjusting module that dynamically adjusts a computer-generated presentation of the avatar in accordance with the determined level of realism, and (5) at least one physical processor that executes the observing module, the mapping module, the determining module, and the adjusting module.

In some examples, the system may further include a presenting module, stored in memory, that presents the dynamically adjusted presentation of the avatar to an additional user as a representation of the user. In such examples, the at least one physical processor may also execute the presenting module. In some examples, presenting the dynamically adjusted computer-generated presentation of the avatar to the additional user may include presenting the dynamically adjusted computer-generated presentation of the avatar to the additional user within at least one of (1) a video conferencing application, (2) a virtual reality environment, or (3) an augmented reality environment.

In at least one embodiment, the system may further include a user interface module, stored in memory, that receives user input representative of a user-defined level of realism for the avatar. In such embodiments, the at least one physical processor may further execute the user interface module, and determining the level of realism may include designating the user-defined level of realism as the level of realism for the avatar.

In some examples, the above-described method may be encoded as computer-readable instructions on a computer-readable medium. For example, a computer-readable medium may include one or more computer-executable instructions that, when executed by at least one processor of a computing device, may cause the computing device to (1) observe, via at least one sensor, at least one attribute of a user, (2) map the observed attribute of the user to a computer-generated avatar that represents the user, (3) determine a level of realism for the avatar, with the level of realism specifying a relationship between an appearance of the avatar and an actual appearance of the user, and (4) dynamically adjust a computer-generated presentation of the avatar in accordance with the determined level of realism.

Features from any of the above-mentioned embodiments may be used in combination with one another in accordance with the general principles described herein. These and other embodiments, features, and advantages will be more fully understood upon reading the following detailed description in conjunction with the accompanying drawings and claims

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for visually representing users in communication applications. As will be explained in greater detail below, embodiments of the instant disclosure may observe, via at least one sensor (e.g., a camera, a touch sensor, a proximity sensor, etc.), at least one attribute of a user, such as eye gaze, posture, facial features, head pose, and so forth. An embodiment may then map the observed attribute to a computer-generated avatar that represents the user, such as by identifying corresponding features of the user and the avatar, and adjusting the corresponding features of the avatar to match the observed attributes of the user.

An embodiment may also determine a level of realism for the avatar that specifies a relationship between the appearance of the avatar and the appearance of the user, and may then dynamically adjust a computer-generated presentation of the avatar in accordance with the determined level of realism. For example, if the determined level of realism is high, the avatar may more closely resemble an actual appearance of the user and, if the determined level of realism is low, the avatar may less closely resemble the actual appearance of the user. The level of realism may be dynamically adjusted based on various factors, such as user input or a level of engagement of the user in a conversation.

By mapping user attributes to a computer-generated avatar that represents the user, the systems and methods described herein may effectively provide a useful middle ground between a video-based representation of the user and a static avatar-based representation of the user. Embodiments of the systems and methods described herein may thus provide an expressive representation of the user within a communications application that may communicate non-verbal cues (e.g., facial expressions) to other users while also giving the user control over how much of their actual appearance they share with other users.

Additionally, embodiments of the instant disclosure may provide for more efficient usage of telecommunications resources (e.g., bandwidth). For example, in a scenario where a user's bandwidth resources may be limited, the user may employ a rich avatar representation such as described herein to augment a low-bandwidth VOIP conversation with another user rather than engaging in a bandwidth-intensive video conference. Such a use case may provide many of the same benefits of a traditional video conference (e.g., face-to-face communication, ability to perceive non-verbal cues, etc.), while utilizing significantly fewer bandwidth resources than a traditional video conference.

The following will provide, with reference to FIGS. 1-2 and 4-9, detailed descriptions of systems for visually representing users in communication applications. Detailed descriptions of corresponding computer-implemented methods will also be provided in connection with FIG. 3.

Figure 1:
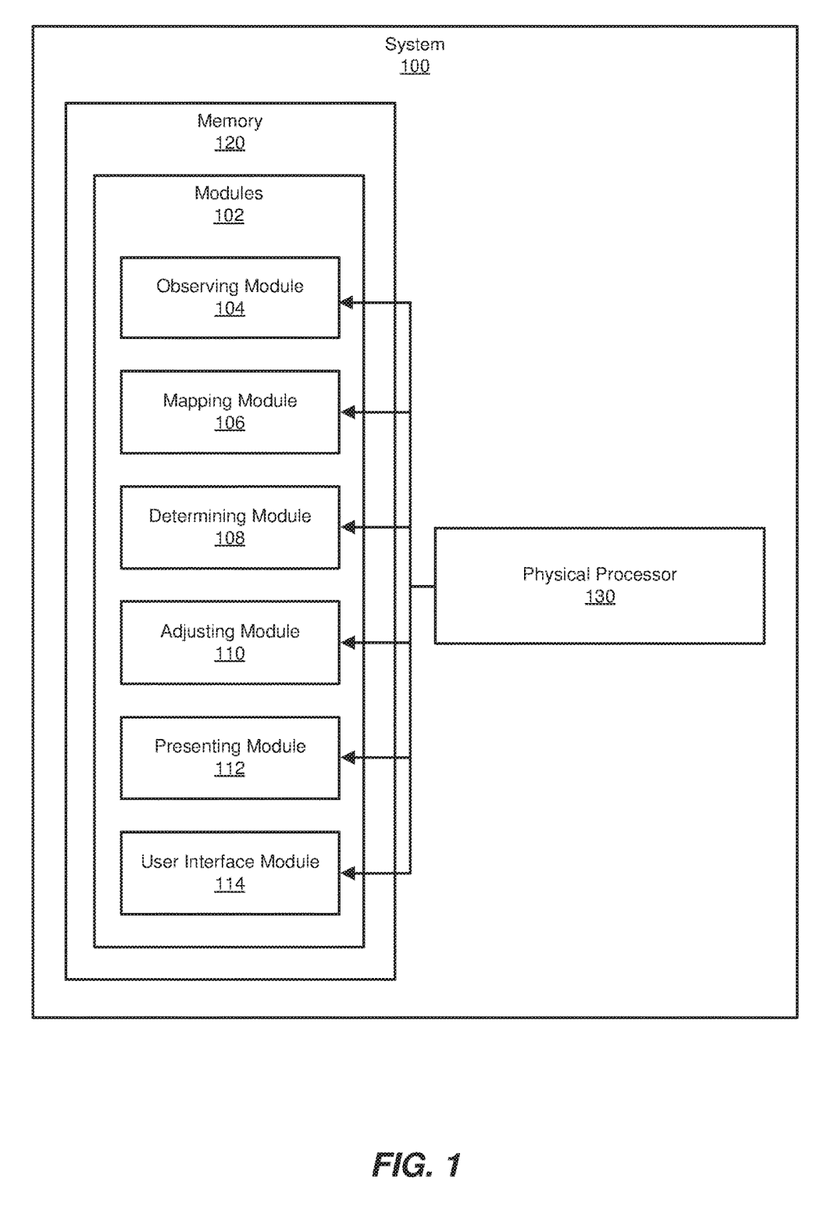
FIG. 1 is a block diagram of an example system for visually representing users in communication applications.

FIG. 1 is a block diagram of an example system 100 for visually representing users in communication applications. As illustrated in this figure, example system 100 may include one or more modules 102 for performing one or more tasks. As will be explained in greater detail below, modules 102 may include an observing module 104 that observes, via at least one sensor, at least one attribute of a user and a mapping module 106 that maps the observed attribute of the user to a computer-generated avatar that represents the user. Example system 100 may additionally include a determining module 108 that determines a level of realism for the avatar, with the level of realism specifying a relationship between an appearance of the avatar and an actual appearance of the user, and an adjusting module 110 that dynamically adjusts a computer-generated presentation of the avatar in accordance with the determined level of realism.

In some embodiments, as further shown in FIG. 1, example system 100 may further include a presenting module 112 that presents the dynamically adjusted presentation of the avatar to an additional user as a representation of the user. In at least one embodiment, example system 100 may also include a user interface module 114 that receives user input representative of a user-defined level of realism for the avatar.

As further illustrated in FIG. 1, example system 100 may also include one or more memory devices, such as memory 120. Memory 120 generally represents any type or form of volatile or non-volatile storage device or medium capable of storing data and/or computer-readable instructions. In one example, memory 120 may store, load, and/or maintain one or more of modules 102. Examples of memory 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As also shown in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 120. Additionally or alternatively, physical processor 130 may execute one or more of modules 102 to facilitate visually representing users in communication applications. Examples of physical processor 130 include, without limitation, microprocessors, microcontrollers, central processing units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Figure 2:
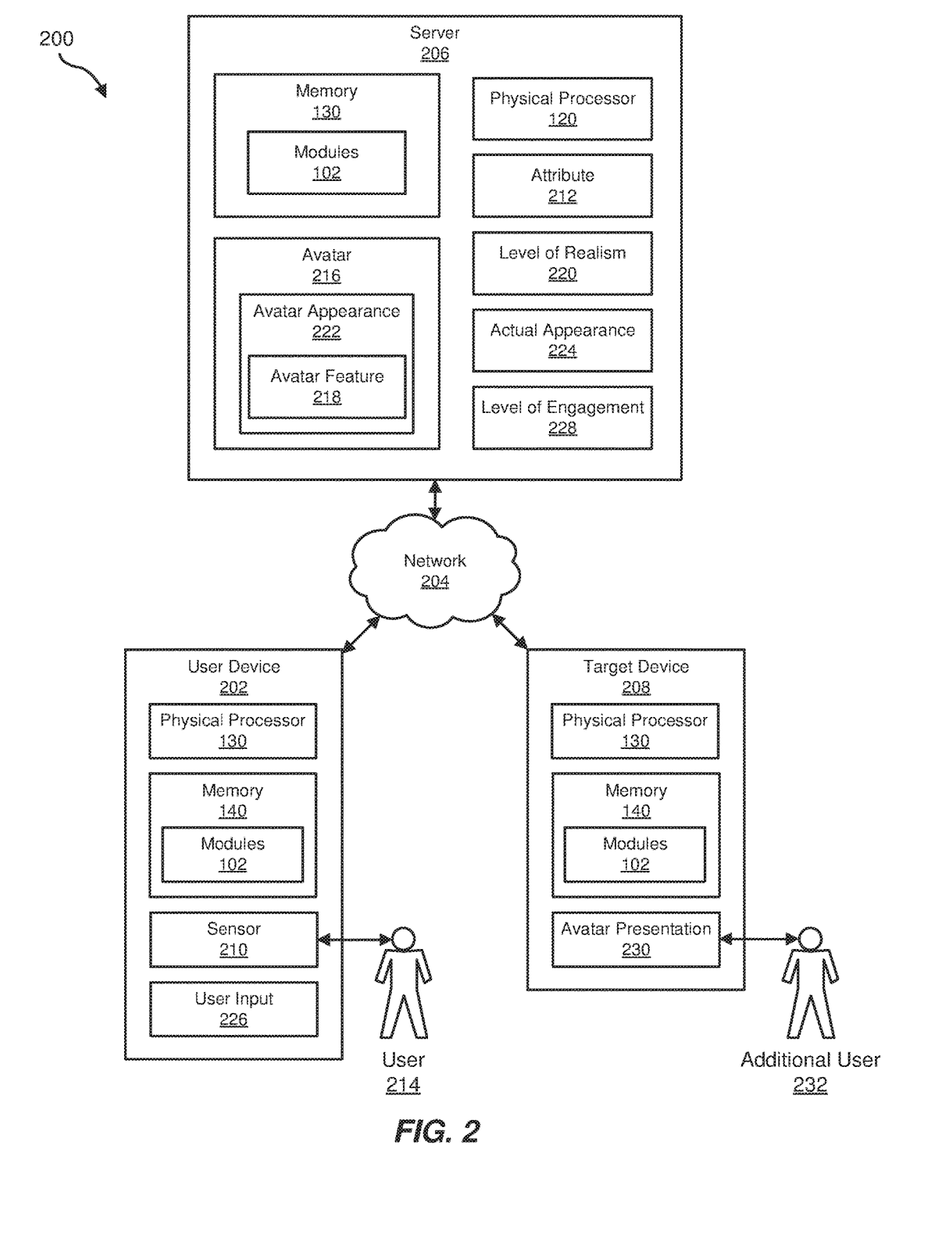
FIG. 2 is a block diagram of an example implementation of a system for visually representing users in communication applications.

Example system 100 in FIG. 1 may be implemented in a variety of ways. For example, all or a portion of example system 100 may represent portions of an example system 200 ("system 200") in FIG. 2. As shown in FIG. 2, system 200 may include user device 202 in communication with server 206 and target device 208 via network 204. In at least one example, user device 202 may be programmed with one or more of modules 102. Additionally or alternatively, server 206 and/or target device 208 may be programmed with one or more of modules 102.

In at least one embodiment, one or more modules 102 from FIG. 1 may, when executed by user device 202, server 206, and/or target device 208, enable user device 202, server 206, and/or target device 208 to perform one or more operations to visually represent users in communication applications. For example, as will be described in greater detail below, observing module 104 may cause user device 202, server 206, and/or target device 208 to observe, via at least one sensor (e.g., sensor 210), at least one attribute (e.g., attribute 212) of a user (e.g., user 214). Furthermore, mapping module 106 may cause user device 202, server 206, and/or target device 208 to map the observed attribute of the user to a computer-generated avatar (e.g., avatar 216) that represents the user. In some examples, mapping module 106 may map the attribute of the user to the avatar by identifying the observed attribute of the user, associating a feature of the computer-generated avatar (e.g., avatar feature 218) with the observed attribute of the user, and adjusting the feature of the computer-generated avatar based on the observed attribute of the user.

Additionally, determining module 108 may cause user device 202, server 206, and/or target device 208 to determine a level of realism (e.g., level of realism 220) for the avatar, with the level of realism specifying a relationship between an appearance of the avatar (e.g., avatar appearance 222) and an actual appearance of the user (e.g., actual appearance 224). In some embodiments, user interface module 114 may cause user device 202, server 206, and/or target device 208 to receive user input representative of a user-defined level of realism for the avatar (e.g., user input 226). In such embodiments, determining module 108 may determine the level of realism by designating the user-defined level of realism as the level of realism (e.g., level of realism 220) for the avatar. In additional embodiments, determining module 108 may determine the level of realism for the avatar by detecting a level of engagement of the user (e.g., level of engagement 228) in a conversation.

In some embodiments, adjusting module 110 may cause user device 202, server 206, and/or target device 208 to dynamically adjust a computer-generated presentation of the avatar (e.g., avatar presentation 230) in accordance with the determined level of realism (e.g., level of realism 220). Also, in some additional embodiments, presenting module 112 may cause user device 202, server 206, and/or target device 208 to present the dynamically adjusted presentation of the avatar to an additional user (e.g., additional user 232) as a representation of the user.

User device 202 generally represents any type or form of computing device capable of reading and/or executing computer-executable instructions. In at least one embodiment, user device 202 may accept one or more directions from server 206 and/or target device 208. Examples of user device 202 include, without limitation, servers, desktops, laptops, tablets, cellular phones, (e.g., smartphones), personal digital assistants (PDAs), multimedia players, embedded systems, wearable devices (e.g., smart watches, smart glasses, etc.), gaming consoles, combinations of one or more of the same, or any other suitable mobile computing device.

Network 204 generally represents any medium or architecture capable of facilitating communication and/or data transfer between user device 202, server 206, and/or target device 208. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network, a code-division multiple access (CDMA) network, a Long-Term Evolution (LTE) network, etc.), universal serial bus (USB) connections, APPLE LIGHTNING connections, and the like. Network 204 may facilitate communication or data transfer using wireless or wired connections. In one embodiment, network 204 may facilitate communication between user device 202, server 206, and target device 208.

Server 206 generally represents any type or form of computing device capable of reading and/or executing computer-executable instructions and/or hosting executables. Examples of server 206 include, without limitation, application servers, storage servers, database servers, web servers, and/or any other suitable computing device configured to run certain software applications and/or provide various application, storage, and/or database services.

Like user device 202, target device 208 generally represents any type or form of computing device capable of reading and/or executing computer-executable instructions. In at least one embodiment, target device 208 may accept one or more directions from user device 202 and/or server 206. Examples of target device 208 include, without limitation, servers, laptops, tablets, cellular phones, (e.g., smartphones), personal digital assistants (PDAs), multimedia players, embedded systems, wearable devices (e.g., smart watches, smart glasses, etc.), gaming consoles, combinations of one or more of the same, or any other suitable mobile computing device. In at least one example, target device 208 may present a dynamically adjusted presentation of an avatar to additional user 232 as a representation of user 214.

In at least one example, user device 202, server 206, and target device 208 may be computing devices programmed with one or more of modules 102. All or a portion of the functionality of modules 102 may be performed by user device 202, server 206, target device 208, and/or any other suitable computing system. As will be described in greater detail below, one or more of modules 102 from FIG. 1 may, when executed by at least one processor of user device 202, server 206, and/or target device 208, enable user device 202, server 206, and/or target device 208 to visually represent users in communication applications.

In some examples, user device 202 and/or target device 208 may be included as part of a mobile robot. In some examples, "robot" may refer to any form of mobile machine, programmable by a computer, capable of autonomously or semi-autonomously carrying out a complex series of actions or tasks. Examples of programmable mobile machines include, without limitation, robots, various aerial mobility systems (e.g., unmanned aerial vehicles), aquatic mobility systems (e.g., autonomous underwater or surface vehicles), and/or spacecraft mobility systems (e.g., unmanned spacecraft or probes) that are capable of omnidirectional movement on the ground, in the air, water, and/or space.

In at least one example, the mobile robot may include one or more features to facilitate telepresence by a remote user, and may, in such an example, be referred to as a "telepresence robot." In some examples, "telepresence" may refer to any technology that allows a person (e.g., a user, such as user 214 and/or additional user 232) to feel as if they are present, or to give an appearance of the user being present, at a location other than their true location.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from those shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

Figure 3:
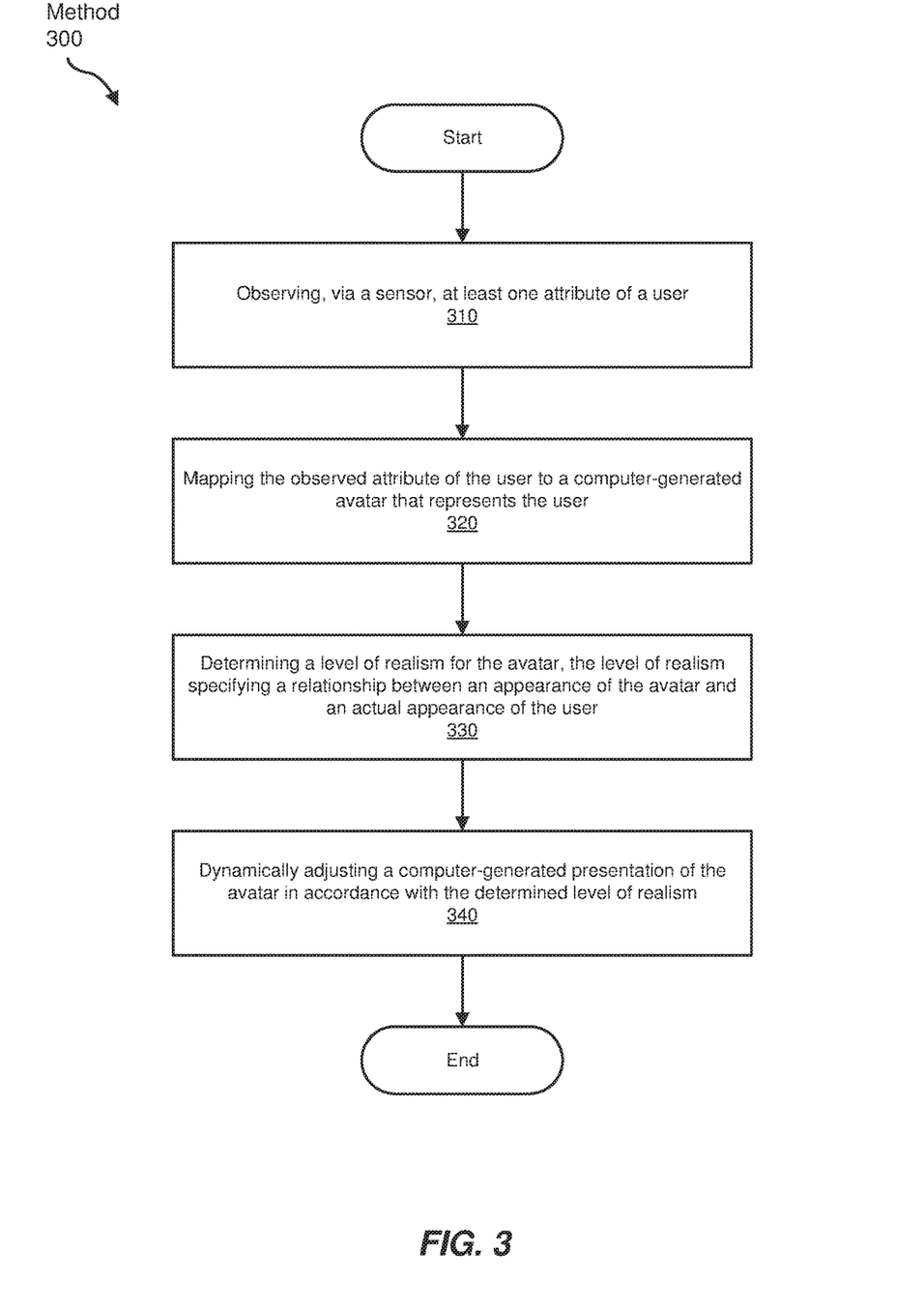
FIG. 3 is a flow diagram of an example method for visually representing users in communication applications.

FIG. 3 is a flow diagram of an example computer-implemented method 300 for allocating shared resources in multi-tenant environments. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310, one or more of the systems described herein may observe, via at least one sensor, at least one attribute of a user. For example, observing module 104 may, as part of user device 202, server 206, or target device 208 in FIG. 2, cause user device 202 to observe, via sensor 210, attribute 212 of user 214.

Sensor 210 may be any suitable sensor that may observe one or more attributes of a user. For example, sensor 210 may include, without limitation, a camera, a thermal camera, a proximity sensor, a temperature sensor, an orientation sensor, an accelerometer, a radar sensor, a sonar sensor, a compass, a global positioning system (GPS) device, and so forth. As noted above in reference to FIG. 2, user device 202 and/or target device 208 may be included as part of a mobile robot. Hence, sensor 210 may also be included as part of a mobile robot and, in some examples, sensor 210 may include a camera included in the mobile robot.

Attribute 212 may be any attribute of user 214 that may be observed by sensor 210. For example, attribute 212 may include, without limitation, an eye gaze of the user, a posture of the user, a facial feature of the user, a head pose of the user, a proximity of the user to user device 202 and/or sensor 210, a direction of movement of the user relative to user device 202 and/or sensor 210, a skin texture of user 214, and so forth.

Observing module 104 may observe, via sensor 210, attribute 212 of user 214 in a variety of contexts. For example, observing module 104 may receive data from sensor 210 regarding observed attribute 212 of user 214. Observing module 103 may then communicate the received data from sensor 210 to any of modules 102 (e.g., mapping module 106, determining module 108, adjusting module 110, etc.) for further analysis and/or processing. In at least one embodiment, sensor 210 may include a camera, and observing module 104 may observe attribute 212 of user 214 by capturing an image of user 214 (e.g., a face of user 214) via the camera included in sensor 210.

Returning to FIG. 3, at step 320, one or more of the systems described herein may map an observed attribute of a user to a computer-generated avatar that represents the user. For example, mapping module 106 may, as part of user device 202, server 206, or target device 208 in FIG. 2, map observed attribute 212 of user 214 to computer-generated avatar 216 that represents user 214.

Mapping module 106 may map the observed attribute of the user to a computer-generated avatar that represents the user in a variety of contexts. For example, mapping module 106 may map the observed attribute of the user to the computer-generated avatar by identifying the observed attribute of the user, associating a feature of the computer-generated avatar with the observed attribute of the user, and adjusting the feature of the computer-generated avatar based on the observed attribute of the user.

Mapping module 106 may identify the observed attribute of the user in any suitable way. For example, mapping module 106 may receive information from sensor 210 (e.g., via observing module 104), and may process the received information to identify attribute 212 of user 214. In at least one embodiment, one or more of modules 102 (e.g., observing module 104, mapping module 106, etc.) may employ a suitable pattern recognition program to identify and/or analyze attribute 212 of user 214. For example, mapping module 106 may use a geometric and/or photometric facial recognition algorithm to analyze an image of user 214 obtained by sensor 210, and may thus determine the relative position, size, and/or shape of the eyes, nose, cheekbones, jaw, and so forth of user 214. Mapping module 106 may further use this information to determine an angle of an attribute, an amplitude of the attribute, a position of the attribute, a proportionality of the attribute relative to another attribute, a size of the attribute, and/or any other identifiable information associated with an observed attribute.

Mapping module 106 may then associate the observed attribute 212 with a feature of avatar 216 (e.g., avatar feature 218). For example, both user 214 and avatar 216 may have eyes capable of gazing in various directions. Mapping module 106 may identify an eye gaze of user 214, and may associate the eye gaze of user 214 with a corresponding eye of avatar 216. Mapping module 106 may then adjust the eye gaze of avatar 216 based on the observed eye gaze of user 214.

Figure 4:
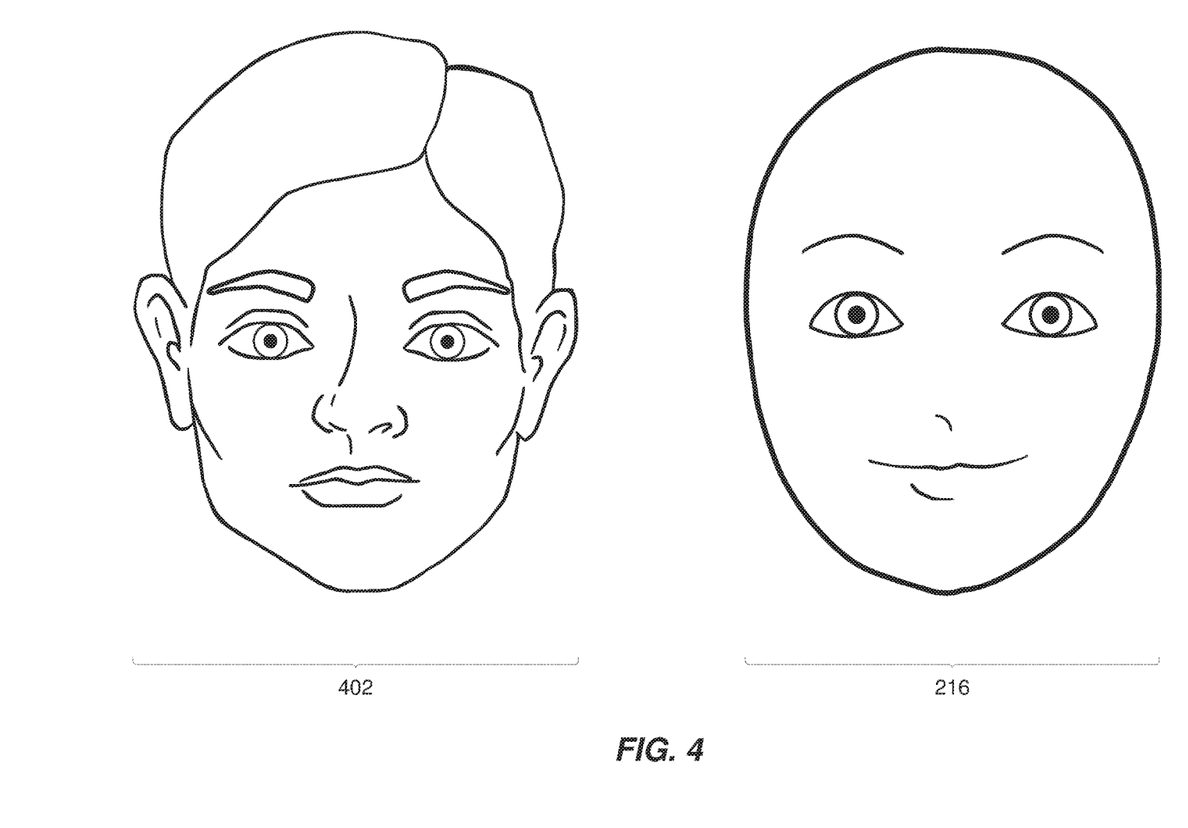
FIGS. 4-5 illustrate an exemplary mapping of an observed attribute of a user to a computer-generated avatar that represents the user.

By way of illustration, FIG. 4 shows an image 402 of user 214 that may be obtained by observing module 104 via sensor 210 alongside an example avatar 216. As shown, image 402 of user 214 includes various attributes that mapping module 106 may identify, including eye gaze, posture, a head pose, various facial features including eyes, eyebrows, a nose, a mouth, and so forth. As further shown in FIG. 4, Avatar 216 includes various features that mapping module 106 may associate with an identified feature of user 214, including eye gaze, posture, a head pose, various facial features including eyes, eyebrows, a nose, a mouth, and so forth.

Figure 5:
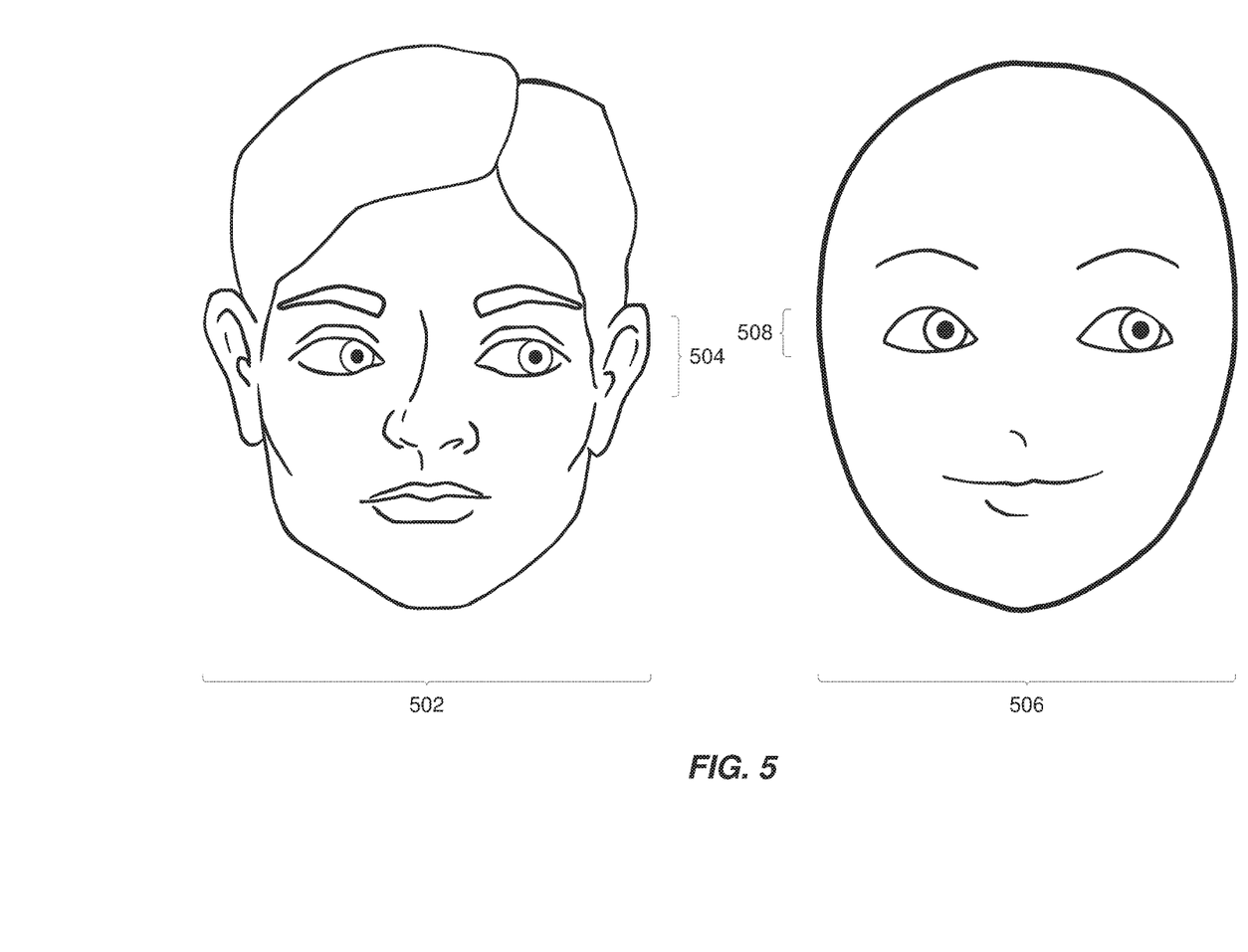

FIG. 5 shows an image 502 of user 214. Image 502 may be similar to image 402 in FIG. 4, with the addition of attribute 504, which may be an eye gaze of user 214. FIG. 5 also shows avatar 506, which may be a view of avatar 216 from FIG. 4 with attribute 504 mapped to a feature 508 of avatar 216. As shown, observing module 104 may observe attribute 504, and mapping module 106 may map attribute 504 to avatar 216 by identifying attribute 504, associating attribute 504 with feature 508 of avatar 216, and adjusting feature 508 based on attribute 504. For example, the eye gaze included in attribute 504 may have a particular position, angle, and/or magnitude. Mapping module 106 may map attribute 504 to avatar 506 by identifying the eye gaze included in attribute 504, determining a position, angle, and/or magnitude of the eye gaze, and associating the eye gaze with feature 508 of avatar 506. Mapping module 106 may then map the observed eye gaze to avatar 506 by adjusting feature 508 of avatar 506 based on the observed eye gaze. As shown in FIG. 5, mapping module 106 may adjust the eye gaze of avatar 506 such that the eye gaze of avatar 506 roughly matches the eye gaze of user 214 shown in image 502.

By observing and mapping attributes of a user to a computer-generated avatar that represents the user, the systems and methods described herein may provide an expressive representation of the user within a communications application that may effectively and efficiently communicate non-verbal cues (e.g., facial gestures) to other users.

Returning to FIG. 3, at step 330, one or more of the systems described herein may determine a level of realism for an avatar, with the level of realism specifying a relationship between an appearance of the avatar and an actual appearance of a user. For example, determining module 108 may, as part of user device 202, server 206, or target device 208 in FIG. 2, determine level of realism 220 for avatar 216, with the level of realism specifying a relationship between avatar appearance 222 and actual appearance 224.

Figure 6:
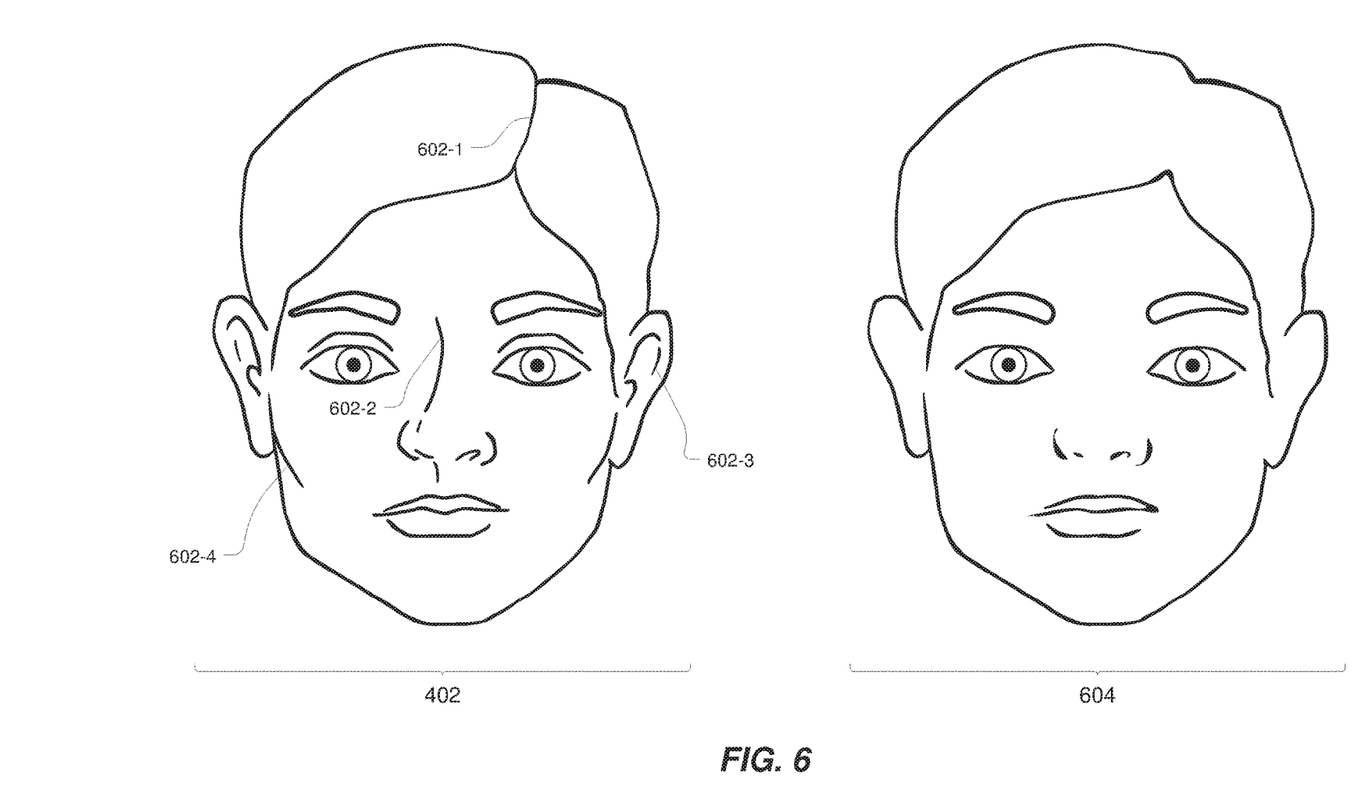
FIGS. 6-7 illustrate exemplary levels of realism for an avatar, as well as dynamically adjusting a computer-generated presentation of an avatar in accordance with a determined level of realism.

In some examples, a level of realism may refer to and/or reflect an amount of detail of an actual appearance of a user that is included in a computer-generated presentation of an avatar. For example, an avatar with a high level of realism may include more details of the actual appearance of the user than an avatar with a low level of realism. By way of illustration, FIG. 6 shows image 402 of user 214 that illustrates an actual appearance (e.g., actual appearance 224) of user 214. Image 402 also highlights various details 602 (e.g., detail 602-1 through detail 602-4) included in the actual appearance of user 214. FIG. 6 also shows avatar 604, which may be an avatar based on the actual appearance of user 214 shown in image 402, but with a reduced level of realism when compared to image 402. As shown, avatar 604 resembles image 402, but has details 602 removed. Hence, avatar 604 may reflect a lower amount of detail than the actual appearance of user 214, and therefore may reflect a reduced level of realism in comparison to image 402. As will be described in greater detail below, adjusting module 110 may dynamically adjust a presentation of avatar 216 (e.g., avatar presentation 230) in accordance with determined level of realism 220 such that avatar appearance 222 includes fewer details than the user's actual appearance (e.g., actual appearance 224).

In some examples, the amount of detail of the user's appearance included in a computer-generated presentation of an avatar (e.g., avatar presentation 230) may be based on a resolution of an image of the user. For example, if determining module 108 determines a reduced level of realism for an avatar (e.g., avatar 216), the avatar may be presented to an additional user as a reduced resolution version of an image of the user observed via sensor 210 (e.g., image 402). In other examples, an avatar (e.g., avatar 216) may be a polygonal model that represents the user. In such examples, the amount of detail of the user's appearance included in a presentation of avatar 216 (e.g., avatar presentation 230) may reflect a number of polygons included in the model of the user, with a higher number of polygons reflecting a higher amount of detail of the user's actual appearance included in avatar presentation 230. In further examples, the avatar (e.g., avatar 216) may be a vector-based representation of the user, and the amount of detail of the user's appearance included in avatar presentation 230 may be based on a number of nodes included the vector-based representation of the user, where a vector-based avatar with a higher determined level of realism may include more nodes, and thus more detail of the user's appearance, than a vector-based avatar that includes fewer nodes.

In additional examples, a level of realism may refer to and/or reflect a degree of correlation between a presentation of an observed attribute of the user by the computer-generated avatar and an actual appearance of the observed attribute of the user. For example, as described above, mapping module 106 may identify an attribute of a user (e.g., attribute 212 of user 214) and determine an angle, amplitude, position, proportionality, size, and so forth of the identified attribute. A level of realism may reflect a degree of correlation between, for example, an actual angle of an observed attribute, and an angle of the observed attribute as presented via avatar 216.

Figure 7:
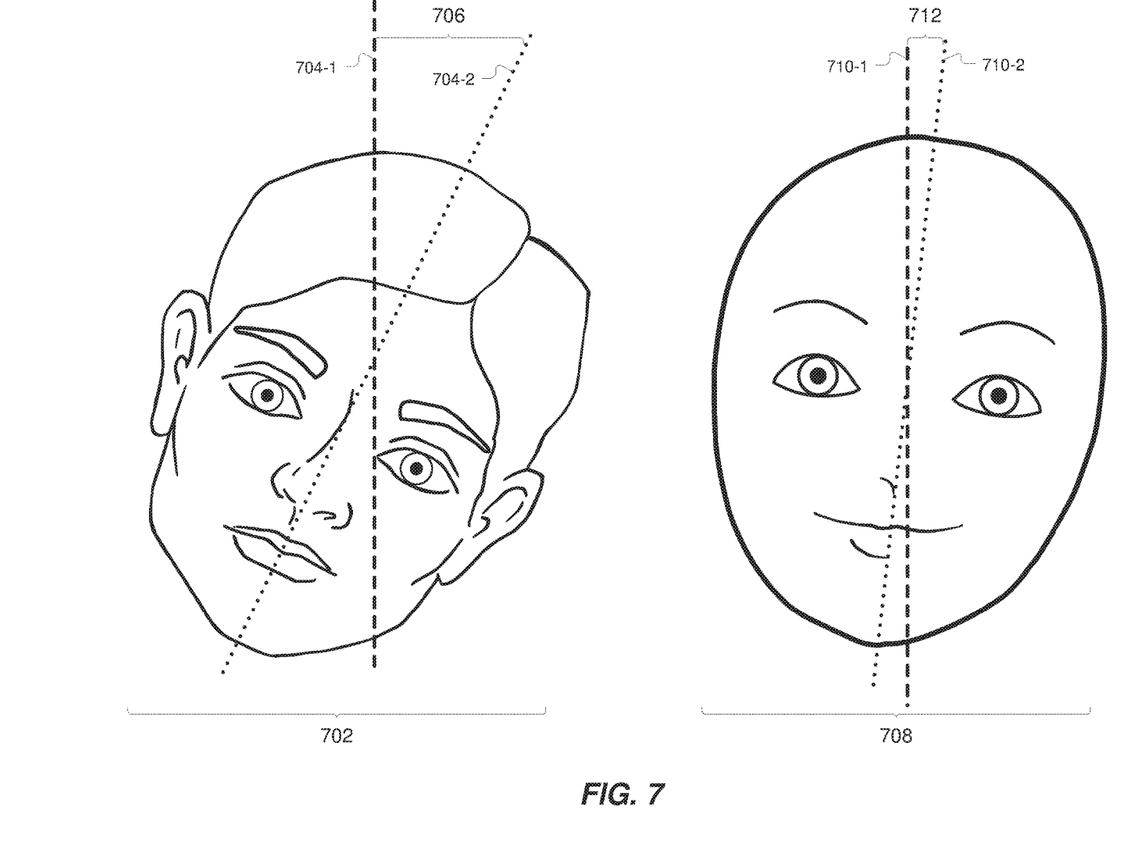

By way of illustration, FIG. 7 shows image 702 of user 214. Image 702 is similar to image 402, but includes reference lines 704 (e.g., reference line 704-1 and reference line 704-2), which indicate that the head of user 214 is posed at an angle 706. One or more of modules 102 (e.g., observing module 104, mapping module 106, etc.) may identify the head pose of user 214 via image 702 as attribute 212, and determine an angle, magnitude, and/or directionality of the head pose of user 214. One or more of modules 102 (e.g., observing module 104, mapping module 106, etc.) may then associate the head pose of user 214 with a head pose feature (e.g., avatar feature 218) of avatar 216, and adjust the head pose feature of avatar 216 based on the determined angle, magnitude, and/or directionality of the head pose of user 214.

Next, determining module 108 may determine a level of realism for avatar 216 (e.g., level of realism 220) that reflects a degree of correlation between a presentation of attribute 212 (e.g., avatar appearance 222) and an actual appearance of attribute 212 (e.g., actual appearance 224). In the example illustrated by FIG. 7, determining module 108 may determine a level of realism (e.g., level of realism 220) that reflects a reduced amplitude of the mapped head pose of user 214 when avatar 216 is presented to an additional user (e.g., to additional user 232 via avatar presentation 230). As will be described in greater detail below, adjusting module 110 may then dynamically adjust a computer-generated presentation of the avatar (e.g., avatar presentation 230 and/or avatar 708) in accordance with the determined level of realism.

Determining module 108 may determine a level of realism for avatar 216 in a variety of contexts. For example, determining module 108 may, via user interface module 114, provide a user interface to user 214 that includes a control for user 214 to define a level of realism. User 214 may interact with the control and define a level of realism for the avatar. Determining module 108 may then receive (e.g., via user interface module 114) user input (e.g., user input 226) representative of the user-defined level of realism for the avatar, and may determine a level of realism for the avatar by designating the user-defined level of realism as the level of realism for the avatar (e.g., level of realism 220).

Figure 8:
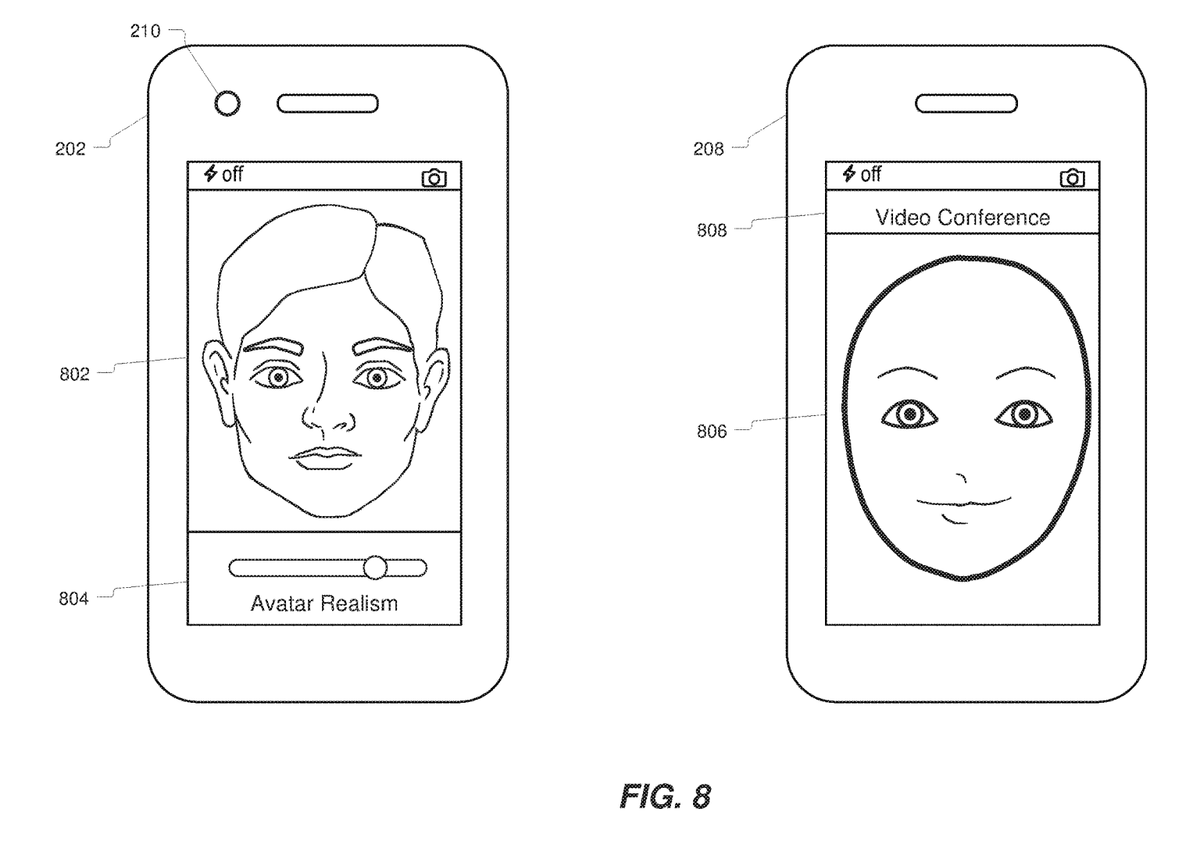
FIG. 8 illustrates receiving exemplary user input representative of a user-defined level of realism for a computer-generated avatar, as well as presenting the computer-generated avatar to an additional user within a video conferencing application.

FIG. 8 illustrates an example user interface that user interface module 114 may present to user 214. As shown, FIG. 8 includes user device 202 (e.g., a smart phone) that includes a sensor 210 (e.g., a front-facing camera included in the smart phone). User device 202 in FIG. 8 includes a user interface 802 that further includes a slider control 804. User interface 802 also shows image 402 obtained via sensor 210. Although user interface 802 shows image 402 in FIG. 8, user interface 802 may additionally or alternatively show any other information including, without limitation, avatar 216, an adjusted version of avatar 216 (e.g., avatar 604, avatar 708, etc.), and/or a view of how a particular user input via slider control 804 may cause avatar 216 to be adjusted.

Using slider control 804, user 214 may define a level of realism for avatar 216. Determining module 108 may then receive this user-defined level of realism (e.g., user input 226), and may then determine a level of realism for avatar 216 (e.g., level of realism 220) based on the user-defined level of realism provided by user 214 via slider control 804.

FIG. 8 also shows, as will be described in greater detail below, a presentation of the avatar, adjusted in accordance with the user-inputted level of realism indicated by slider control 804, to an additional user as a representation of the user within a video conferencing program. As illustrated, FIG. 8 shows target device 208 (e.g., another smart phone) that is presenting avatar 216 within a user interface 806. Label 808 indicates that user interface 806 is part of a video conferencing program. Additional user 232 may interact with user 214 through this video conferencing program via dynamically adjusted avatar 216, which may effectively convey useful non-verbal information from user 214 to additional user 232 while maintaining a desired level of privacy for user 214.

In at least one embodiment, determining module 108 may determine a level of realism for the avatar (e.g., avatar 216) by detecting a level of engagement of a user in a conversation (e.g., level of engagement 228), and may then determine the level of realism for the avatar (level of realism 220) based on the detected level of engagement of the user in the conversation. In some examples, "level of engagement" may refer to an amount of attention a user (e.g., user 214) is devoting to a conversation being facilitated via avatar 216.

Determining module 108 may detect a level of engagement of the user in a variety of contexts. For example, determining module 108 may detect a level of engagement of a user based on various observed attributes of the user. Determining module 108 may use any observed, detected, identified, and/or determined attribute of a user as described herein to detect a level of engagement of the user. For example, one or more modules 102 (e.g., observing module 104, mapping module 106, etc.) may identify and/or detect an eye gaze of user 214 (e.g., via sensor 210). Determining module 108 may then use this information to determine that the eye gaze of user 214 indicates that user 214 is looking away from sensor 210. Hence, determining module may detect a reduced level of engagement, and thus may determine a reduced level of realism for the avatar. As another example, determining module 108 may detect (e.g., via sensor 210, observing module 104, mapping module 106, etc.) a head pose of the user, and may determine that the head pose of the user indicates that the user is paying less attention to a conversation (e.g., a conversation being facilitated by avatar 216).

In other examples, determining module 108 may detect (e.g., via sensor 210) a position of the face of user 214 relative to sensor 210, a distance of user 214 from sensor 210, a volume of the voice of user 214, and/or any other attribute. Determining module 108 may then detect, based on the detected attribute, a level of engagement of user 214 in a conversation. Determining module 108 may then determine a level of realism for avatar 216 based on the detected level of engagement. Adjusting module 110 may then adjust a presentation of avatar 216 (e.g., avatar presentation 230) based on the determined lower level of realism. This may serve to communicate the level of engagement of user 214 in a conversation to another user (e.g., additional user 232).

Figure 9:
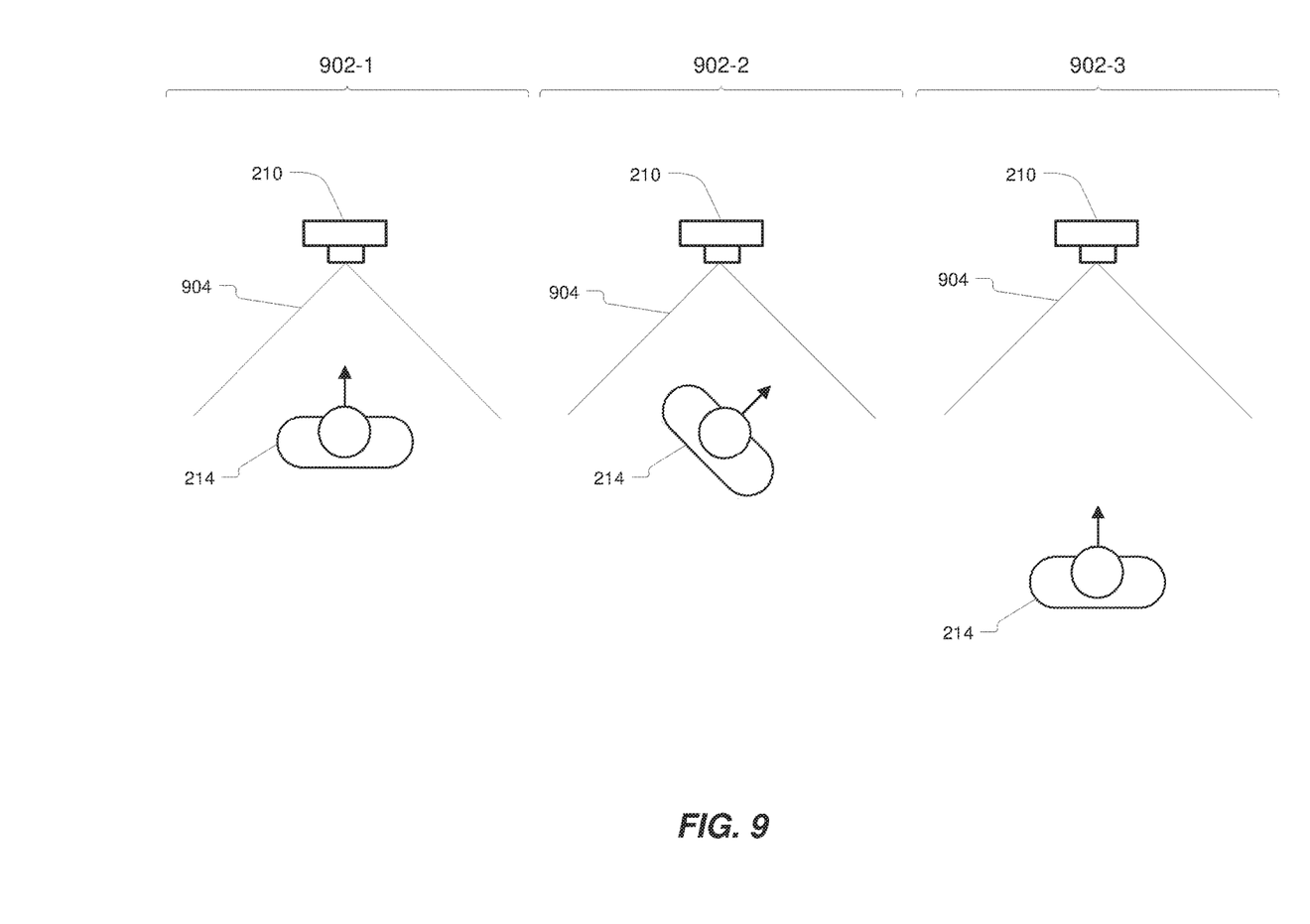
FIG. 9 illustrates an exemplary determination of a level of realism for an avatar that represents a user by detecting a level of engagement of the user in a conversation.

FIG. 9 illustrates a few examples of determining module 108 determining a level of realism for an avatar that represents a user by detecting a level of engagement of the user in a conversation. As shown, FIG. 9 illustrates three different user engagement scenarios 902 (e.g., user engagement scenarios 902-1 through 902-3). Each user engagement scenario 902 shows user 214 within an area of perception 904 of sensor 210. In user engagement scenarios 902, determining module 108 may be configured to detect a level of user engagement based on a detected distance of user 214 from sensor 210 and/or a detected head pose of user 214.

In user engagement scenario 902-1, user 214 is relatively close to sensor 210 and is facing directly toward sensor 210. In this user engagement scenario, determining module 108 may detect a high level of engagement, and may therefore determine a relatively high level of realism for avatar 216. In user engagement scenario 902-2, user 214 is approximately the same distance from sensor 210 as in user engagement scenario 902-1, but is turned away from sensor 210. In this user engagement scenario, determining module 108 may detect a lower level of user engagement than it may detect in relation to user engagement scenario 902-1, and may therefore determine a lower level of realism for avatar 216 than in relation to user engagement scenario 902-1. Finally, in user engagement scenario 902-3, user 214 is relatively far from sensor 210, and is facing toward sensor 210. In this user engagement scenario, determining module 108 may detect a lower level of user engagement than it may detect in relation to user engagement scenario 902-1, and may therefore determine a lower level of realism for avatar 216 than in relation to user engagement scenario 902-1. The user engagement scenarios shown in FIG. 9 are examples only, as there may be many other user engagement scenarios that may cause determining module 108 to detect suitable levels of engagement.

By determining a level of realism for a computer-generated avatar that specifies a relationship between an appearance of the avatar and an actual appearance of a user, embodiments of the instant disclosure may provide a useful privacy control that allows a user to determine how much detail of his or her actual appearance to communicate to another user via the avatar. Additionally, a level of realism may be determined based on a level of user engagement, which may provide a useful feedback mechanism to a person who is participating in a conversation with the user that is facilitated by the computer-generated avatar.

Returning to FIG. 3, at step 340, one or more of the systems described herein may dynamically adjust a computer-generated presentation of the avatar in accordance with the determined level of realism. For example, adjusting module 110 may, as part of user device 202, server 206, or target device 208 in FIG. 2, dynamically adjust avatar presentation 230 in accordance with determined level of realism 220.

Adjusting module 110 may dynamically adjust a computer-generated presentation of the avatar in accordance with the determined level of realism in a variety of contexts. For example, adjusting module 110 may, as described above in relation to FIG. 6, dynamically adjust a level of detail included in an avatar to reflect the determined level of realism. Additionally, as described above in relation to FIG. 7, adjusting module 110 may dynamically adjust one or more features of an avatar to reflect the determined level of realism. The adjusting of the computer-generated presentation of the avatar may be dynamic in that the adjusting may occur at any time when one or more of modules 102 (e.g., determining module 108) determines a new level of realism for avatar 216 (e.g., a new user input 226 of a user-defined level of realism, a change in level of engagement 228, and so forth). Thus, adjusting module 110 may constantly and repeatedly adjust the computer-generated presentation of the avatar in response to new and/or changing determinations of a level of realism.

By way of illustration, returning to FIG. 7, avatar 708 in FIG. 7 is an adjusted presentation of avatar 216 that may be presented (e.g., via presenting module 112) to an additional user (e.g., additional user 232). As shown, avatar 708, like image 702, also presents a head pose, as indicated by reference lines 710 (e.g., reference line 710-1 and reference line 710-2). However, the head pose of avatar 708 is at an angle 712, which is visibly less (i.e., more acute than) than angle 706. Thus, avatar 708 may have a feature (e.g., a head pose) that may be mapped to an observed attribute of user 214 (e.g., a head pose of user 214), but avatar 708 may present that attribute of user 214 in accordance with determined (i.e., reduced) level of realism). In other words, the appearance of the head pose of avatar 708 correlates to the actual appearance of the head pose of user 214 shown in image 402, but to a reduced degree. Hence, avatar 708 may have a reduced level of realism in comparison to image 702 of user 214.

By dynamically adjusting a level of realism for an avatar, the avatar may dynamically include more or less of the user's actual appearance in the avatar, and may therefore communicate more or less of the user's actual appearance to others via the avatar. The systems and methods described herein may thus provide a varying degree of richness of communication via communication applications while maintaining a user-controlled level of privacy. Additionally, in some contexts, a level of realism may dynamically communicate and/or reflect a user's engagement (e.g., attention to, participation in, etc.) in a conversation. This variable level of realism may provide a useful mechanism for other users to gauge the user's engagement in the conversation.

In some embodiments, one or more of the systems described herein may present a dynamically adjusted presentation of an avatar to an additional user as a representation of a user. For example, presenting module 112 may, as part of user device 202, server 206, or target device 208 in FIG. 2, present the dynamically adjusted avatar presentation 230 of avatar 216 to additional user 232 as a representation of user 214.

Presenting module 112 may present the dynamically adjusted presentation of the avatar to the additional user as the representation of the user in a variety of contexts. For example, as described above, presenting module 112 may present the dynamically adjusted presentation of the avatar (e.g., avatar presentation 230 of avatar 216) to an additional user (e.g., additional user 232) as a representation of the user (e.g., user 214). Thus, user 214 may communicate with additional user 232 via avatar presentation 230 of avatar 216. Presenting module 112 may do so within any suitable communications application. For example, as described above in reference to FIG. 8, presenting module 112 may present avatar presentation 230 of avatar 216 to additional user 232 within a video conferencing application via target device 208.

In some embodiments, presenting module 112 may present avatar presentation 230 of avatar 216 to additional user 232 within an artificial reality environment. For example, avatar 216 may be a two-dimensional and/or three-dimensional model that may be presented within a virtual reality and/or augmented reality environment. The systems and methods described herein may therefore observe an attribute of user 214, map the attribute to avatar 216, determine a level of realism for avatar 216, and dynamically adjust presentation 230 of avatar 216 in accordance with the determined level of realism (e.g., level of realism 220). Presenting module 112 may then present the dynamically adjusted avatar to additional user 232 within the artificial reality environment as a representation of user 214 within the artificial reality environment. User 214 and additional user 232 may then interact within the artificial reality environment via avatar presentation 230 of avatar 216 in any of the ways described herein.

Additionally, presenting module 112 may present the dynamically adjusted avatar to additional user 232 via a mobile robot. For example, as described above, target device 208 may be included as part of a mobile robot located in proximity to (e.g., at a common location with) additional user 232. User 214, who may be at a remote location separate from the mobile robot and the additional user, may control or otherwise utilize one or more telepresence features of the mobile robot to remotely interact with people and/or objects located within a real-world environment. Thus, the mobile robot may represent the user within the real-world environment.

The mobile robot may include a suitable display device that may be configured to present any of the avatars described herein to additional user 232, and presenting module 112 may direct target device 208 to present dynamically adjusted avatar presentation 230 of avatar 216 to additional user 232 by way of the display device included in the mobile robot. Additional user 232 may therefore communicate and/or interact with user 214 via the mobile robot using avatar presentation 230 of avatar 216.

In some examples, a plurality of users may communicate with additional user 232 via the mobile robot. For example, two or more users may be located at an office in one city while the mobile robot and additional user 232 may be located at an office in another city. An embodiment of the systems and methods described herein may, for each user in the plurality of users, dynamically adjust and/or present an avatar presentation 230 of a corresponding avatar 216, such that each user 214 in the plurality of users may be represented by a corresponding avatar presentation 230 of a corresponding avatar 216. Presenting module 112 may then direct the mobile device to present the plurality of avatar presentations corresponding to the plurality of users to additional user 232 via the display device of the mobile robot.

Hence, if there are multiple users 214 at a location remote from the mobile robot and additional user 232, the mobile robot may represent each of the multiple users with a separate avatar that may be independently and dynamically adjusted in accordance with determined levels of realism in accordance with the systems and methods described herein. In these and other ways, the systems and methods described herein may be implemented within, and may enhance the functionality and usefulness of, a mobile robot.

As discussed throughout the instant disclosure, the disclosed systems and methods may provide one or more advantages over traditional systems and methods for representing users within communications applications. For example, mapping observed attributes of a user directly to an avatar may provide many of the same benefits of face-to-face communication, such as an ability to read the user's facial expressions, an ability to see where the user is directing his or her attention, and so forth. However, because the user is represented by an avatar, the user's privacy is maintained.

Additionally, dynamically adjusting a level of realism of the avatar may allow a user to decide how much of his or her actual appearance is communicated to other users via the avatar. A higher level of realism may allow for a more direct mapping of observed attributes to features of the avatar, whereas a lower level of realism may result in a more abstract and/or less direct mapping of the user's actual appearance to the avatar. Additionally, the level of realism may be throttled based on a level of engagement of the user in a conversation, which may serve to communicate that level of engagement to other users, and thereby create a richer and/or more useful communication experience.

Finally, embodiments of the instant disclosure may be applied within any communications application where a user may be represented by an avatar including, without limitation, video conferencing applications, virtual reality environments, and augmented reality environments. These systems and methods may therefore serve to enhance and/or improve many different communications methodologies and/or systems, and thus provide users with rich and useful communication experiences.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive sensor to be transformed, transform the sensor data to an avatar that represents the user, output a result of the transformation to represent the user in a communications application, use the result of the transformation to adjust the dynamically adjust the avatar, and store the result of the transformation to further represent the user in other communication applications. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    observing, via at least one sensor, at least one attribute of a user;
    mapping the observed attribute of the user to a computer-generated avatar that represents the user;
    determining a level of realism for the avatar, the level of realism indicating a degree of correlation between an appearance of the observed attribute and a presentation of the attribute on the computer-generated avatar;
    generating the computer-generated presentation of the avatar in accordance with the mapped observed attribute and the level of realism;
    dynamically determining an updated level of realism for the avatar; and
    dynamically adjusting the computer-generated presentation of the avatar in accordance with the updated level of realism.

2. The computer-implemented method of claim 1, further comprising presenting the dynamically adjusted computer-generated presentation of the avatar to an additional user as a representation of the user.

3. The computer-implemented method of claim 2, wherein presenting the dynamically adjusted computer-generated presentation of the avatar to the additional user comprises presenting the dynamically adjusted computer-generated presentation of the avatar to the additional user via a mobile robot.

4. The computer-implemented method of claim 3, wherein:
    the additional user and the mobile robot are at a common location and the user is at a remote location; and
    the mobile robot represents the user at the common location.

5. The computer-implemented method of claim 2, wherein presenting the dynamically adjusted computer-generated presentation of the avatar to the additional user comprises presenting the dynamically adjusted computer-generated presentation of the avatar to the additional user within at least one of:
    a video conferencing application;
    a virtual reality environment; or
    an augmented reality environment.

6. The computer-implemented method of claim 1, wherein the attribute of the user comprises at least one of:
    an eye gaze of the user;
    a posture of the user;
    a facial feature of the user; and
    a head pose of the user.

7. The computer-implemented method of claim 1, wherein mapping the attribute of the user to the avatar comprises:
    identifying the observed attribute of the user;
    associating a feature of the computer-generated avatar with the observed attribute of the user; and
    adjusting the feature of the computer-generated avatar based on the observed attribute of the user.

8. The computer-implemented method of claim 7, wherein identifying the attribute comprises determining at least one of:
    an angle of the attribute;
    an amplitude of the attribute;
    a directionality of the attribute;
    a position of the attribute;
    a proportionality of the attribute relative to another attribute; or
    a size of the attribute.

9. The computer-implemented method of claim 1, wherein:
    dynamically determining the updated level of realism for the avatar comprises detecting a level of engagement of the user in a conversation; and
    the step of dynamically determining the updated level of realism for the avatar is based on the detected level of engagement of the user in the conversation.

10. The computer-implemented method of claim 9, wherein detecting the level of engagement of the user in the conversation comprises detecting at least one of:
    an eye gaze of the user;
    a head pose of the user;
    a position of a face of the user relative to the at least one sensor;

a distance of the user from the at least one sensor; and
a volume of a voice of the user.

11. The computer-implemented method of claim 1, further comprising receiving user input representative of a user-defined level of realism for the avatar, wherein dynamically determining the updated level of realism comprises designating the user-defined level of realism as the updated level of realism for the avatar.

12. The computer-implemented method of claim 1, wherein the level of realism reflects an amount of detail of the actual appearance of the user that is included in the computer-generated presentation of the avatar.

13. The computer-implemented method of claim 12, wherein the amount of detail of the user's appearance is based on at least one of:
a resolution of an image of the user;
a number of polygons of a model of the user; and
a number of nodes of a vector-based representation of the user.

14. The computer-implemented method of claim 1, wherein the at least one sensor is included in a mobile robot.

15. The computer-implemented method of claim 14, wherein the at least one sensor comprises a camera included in the mobile robot.

16. A system comprising:
an observing module, stored in memory, that observes, via at least one sensor, at least one attribute of a user;
a mapping module, stored in memory, that maps the observed attribute of the user to a computer-generated avatar that represents the user;
a determining module, stored in memory, that determines a level of realism for the avatar, the level of realism indicating a degree of correlation between an appearance of the observed attribute and a presentation of the attribute on the computer-generated avatar;
an adjusting module, stored in memory, that dynamically adjusts the level of realism of a computer-generated presentation of the avatar in accordance with the determined level of realism; and
at least one physical processor that executes the observing module, the mapping module, the determining module, and the adjusting module.

17. The system of claim 16, wherein:
the system further comprises a presenting module, stored in memory, that presents a dynamically adjusted presentation of the avatar to an additional user as a representation of the user by presenting the dynamically adjusted computer-generated presentation of the avatar to the additional user within at least one of:
a video conferencing application;
a virtual reality environment; or
an augmented reality environment; and
the at least one physical processor further executes the presenting module.

18. The system of claim 16, further comprising a user interface module, stored in memory, that receives user input representative of a user-defined level of realism for the avatar;
wherein:
the at least one physical processor further executes the user interface module; and
the determining module determines the level of realism by designating the user-defined level of realism as the level of realism for the avatar.

19. A non-transitory computer-readable medium comprising instructions that, when executed by at least one processor of a computing system, cause the computing system to:
observe, via at least one sensor, at least one attribute of a user;
map the observed attribute of the user to a computer-generated avatar that represents the user;
determine a level of realism for the avatar, the level of realism indicating a degree of correlation between an appearance of the observed attribute and a presentation of the attribute on the computer-generated avatar;
generate the computer-generated presentation of the avatar in accordance with the mapped observed attribute and the level of realism;
dynamically determine an updated level of realism for the avatar; and
dynamically adjust the computer-generated presentation of the avatar in accordance with the updated level of realism.

* * * * *